3,475,383
FUEL RESISTANT POLYURETHANES

Floyd D. Stewart, Akron, Ohio, assignor to The B. F. Goodrich Company, New York, N.Y., a corporation of New York
No Drawing. Filed June 22, 1967, Ser. No. 647,916
Int. Cl. C08g 22/10, 22/14
U.S. Cl. 260—75          12 Claims

ABSTRACT OF THE DISCLOSURE

Polyurethanes which are relatively impermeable to high aromatic content fuel, are prepared by reacting an organic diisocyanate with a hydroxyl-terminated polyester, hydroxyl poly(alkylene oxide) or polyacetal and an aliphatic diol containing nitro- or halogen-groups as substituents.

Background of the invention

Thermoplastic polyurethanes of the types described in U.S. Patents 2,871,218 and 2,899,411 are essentially linear polyurethanes which have high tensile strengths and an excellent balance of other desirable physical and chemical properties. Such materials are prepared from hydroxyl-terminated polyesters or poly(alkylene oxide)s, aliphatic glycols and organic diisocyanates reacted in molar proportions where the mols of polyether or polyester and aliphatic glycols are substantially equivalent to the mols of organic diisocyanates.

While such polyurethanes have excellent resistance to oil and hydrocarbon fuels, it has been found that certain aromatic fuels migrate through these polyurethanes and make them unsuited for some applications. In such applications as flexible fuel tanks, where the described polyurethanes are particularly adaptable, the rate of the diffusion of aromatic fuels, or fuels high in aromatic content, require, in the construction of such containers, fuel barriers. In the construction of fuel tanks from polyurethanes where aromatic containing fuels are involved a barrier such as nylon film has to be built into the fuel tank. This is costly both in extra handling and fabrication as well as the extra materials required.

This invention now provides an improved thermoplastic polyurethane elastomer which is strong enough to allow unsupported fuel tank constructions and which are impermeable enough to contain high aromatic content fuel without the use of a fuel barrier. Specifically, the polyurethanes of this invention meet certain specification requirements for a material construction which will not permit diffusion of a 40/60% toluene-isooctane fuel in amounts greater than 0.025 fluid ounces per sq. ft. in 24 hours.

Summary of the invention

The improved polyurethanes of this invention are prepared by reacting hydroxyl-terminated polyesters, hydroxyl(polyalkylene oxide)s, or hydroxyl polyacetals and certain aliphatic diols containing nitro- or halo-groups as substituents with about an equimolar proportion of an organic diisocyanate. These polyurethanes are thermoplastic, have an excellent balance of physical properties, including a fuel permeability diffusion rate of 40/60% toluene-isooctane fuel of less than 0.05 fluid ounces per sq. ft. for 24 hours, and in the more preferred embodiments, diffusion rates less than 0.025 unit and with some polymers, a diffusion rate of essentially zero.

Detailed description of the invention

The hydroxyl polyesters are hydroxyl-terminated polyesters having molecular weights between about 500 and 4000 and an acid number less than 10. The polyesters include lactone polyesters and polyesters prepared by an esterification reaction of an aliphatic dibasic acid or an anhydride thereof with the glycol. Lactone polyesters are readily prepared from epsilon lactones and bifunctional compounds, particularly the glycols and the polyethers listed below.

The basic polyesters utilized include polyesters prepared by the esterification of aliphatic dicarboxylic acids including for example, adipic, succinic, pimelic, suberic, azelaic, sebacic and the like or their anhydrides. Minor proportions of aromatic dicarboxylic acids may be used. Useful acids are those aliphatic dicarboxylic acids of the formula HOOC—R—COOH where R is an alkylene radical containing 2 to 8 carbon atoms. The glycols used in the preparation of the polyesters by reaction with the dicarboxylic acids are glycols containing between 2 and 10 carbon atoms such as ethylene glycol, propanediol, butanediol, hexamethylenediol-1,6, octamethylenediol-1,8, 2-ethylhexyl glycol-1,6 and the like.

The hydroxyl(polyalkylene oxide)s, or polyethers, preferably are essentially linear hydroxyl-terminated compounds having ether linkages as the major linkage joining carbon atoms. The molecular weights may vary between about 500 and 4000. The hydroxyl(polyalkylene oxide)s found useful include hydroxyl poly(methylene oxide)s such as hydroxyl poly(tetramethylene oxide), hydroxyl poly(trimethylene oxide), hydroxyl poly(hexamethylene oxide) and the like, hydroxyl poly(1,2-propylene oxide)s, hydroxyl poly(ethylene oxide)s; of the formula,

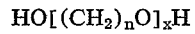

$$HO[(CH_2)_nO]_xH$$

wherein $n$ is a number from 2 to 6 and $x$ is an integer.

Polyacetals are generally prepared by the reaction of an aldehyde and a polyhydric alcohol with an excess of the alcohol, including for example, reaction products of aldehydes such as formaldehyde, paraldehyde, propionaldehyde, butyraldehyde, valeraldehyde, acrolein and the like reacted with glycols; for example, ethylene glycol, trimethylol propane, hexanediol, diethylene glycol, and the like which are well known to those skilled in the art. Generally, the polyacetals may be considered to be reaction products of aldehydes and glycols. The molecular weights of the polyacetal will be varied from about 500 to about 4000.

In the practice of the invention, and a critical feature thereof, a glycol, preferably an aliphatic glycol, containing halo- and nitro-groups, and the polyester, polyether or polyacetal are reacted with the organic diisocyanate. Such glycols normally are aliphatic glycols containing 2 to 8 carbon atoms and more preferably 3 to 6 carbon atoms, and at least one nitro, chloro, bromo or fluoro substituent. Better results have generally been obtained with glycols which do not contain unsaturation. Typical glycols which have been employed include 2-ethyl-2-nitro-1,3 - propanediol, 2 - methyl - 2 - nitro - 1,3 - propanediol, 3 - chloro-1,2-propanediol, 2,3-dibromo-1,4-butanediol, 3-chloro-1,2-propanediol, 2-bromo-1,3-propanediol, 3,4-dibromo-1,3-butanediol, 2 - fluoro - 1,4-butanediol, 2-ethyl - 2 - chloro - 1,6 - hexanediol, 2 - methyl - 3 - nitro-1,4-butanediol and the like. It is essential only that the glycol contain at least one nitro- or halo-group to obtain the advantages of the invention. So long as there is at least one half mol of one of these glycols per mol of polyester, polyether or polyacetal present, the remainder of the glycol may be an aliphatic diol containing 2 to 8 carbon atoms.

The amount of halo- or nitro-glycol used is based on the polyester, polyether or polyacetal and diisocyanate and may vary from about 0.5 to 12 mols per mol of polyester, polyether or polyacetal. Excellent polyurethanes are obtained with a molar ratio of one mol of polyester, polyether or polyacetal and 1 to 5 mols of the halo- or nitro-glycol. There may be used, for example, 1 mol of chloroglycol and 1 to 10 mols of another aliphatic glycol as butanediol-1,4.

The organic diisocyanates which are reacted with the polyester, polyether or polyacetal and nitro- or haloglycol will include, for example, both aliphatic and aromatic diisocyanates, although the aromatic diisocyanates generally result in polymers with a more desirable balance of required physical properties. Such diisocyanates include for example, hexamethylene diisocyanate, and the more desirable aromatic diisocyanates include naphthalene-1,5-diisocyanate, diphenyl methane-p,p'-diisocyanate, m-tolylene diisocyanate, p-phenylene diisocyanate, dichlorodiphenyl methane diisocyanate, dimethyl diphenyl ether diisocyanates, bitolylene diisocyanates and the like. A particularly useful group of diisocyanates are those of the formula

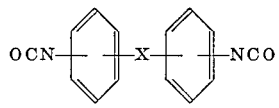

wherein X may be a valence bond, an alkylene radical containing 1 to 5 carbon atoms, NR where R is an alkly radical, oxygen, sulfur, sulfoxide, sulfone and the like.

The ratio of reactants employed may be varied from about 1.5 to 13 mols or organic diisocyanate per mol of polyester, polyether or polyacetal with 0.5 to 12 mols of the halo- or nitro-glycol. The amount of organic dioscyanate used is dependent on the total amount of glycol and polyester, polyether or polyacetal, and should be essentially a molar amount equivalent to the total of these latter two reactants so that there are essentially no free unreacted isocyanate groups remaining in the polymer. Excellent results have been obtained when a molar ratio of one mol of polyester, one to 5 mols of halo- or nitro-glycol are reacted with 2 to 6 mols of the organic diisocyanate. While equimolar reaction ratios are preferred it will be understood, of course, that a slight excess of any reactant, preferably less than 5% of excess organic diisocyanate can be used, although larger amounts of organic diisocyanate may be used.

The reaction employed to prepare the polyurethanes should be conducted under essentially anhydrous conditions with dry reactants. The requirements of this process are met when the reaction mixture is essentially free of water. In all of the examples which follow, a standard reaction procedure was followed. The specified molar ratios of polyester, polyether, or polyacetal and the halo- or nitro-glycol were melted in a reactor and stirred at a pressure of 5 to 6 milliliters at 100 to 110° C. to remove any moisture. To this mixture there is then added the organic diisocyanate and after stirring to obtain complete mixing, the mixture is poured into a silicone coated container which is sealed and heated to 140° C. for about 3 hours. Reaction temperatures between about 100 to 150° C. have been employed, with equivalent longer reaction times at the lower temperatures. The permeability of the polyurethanes to a 40% toluene-60% isooctane mixture is determined by a static test. A container is filled with standard volume of the test liquid, the opening sealed with a 0.025 inch thick piece of the polyurethane to be tested, weighed, inverted and held at 25° C. for 120 hours. The loss in weight is then determined and permeability calculated as fluid ounces passing through the polyurethane per square foot in 24 hours.

Examples

A series of polyurethanes were prepared by reacting together one mol of a hydroxyl-terminated polyester of butanediol-1,4 and adipic acid, poly(tetramethylene adipate) glycol, having a molecular weight of 1030, diphenyl methane-4,4'-diisocyanate, and certain nitro- and haloglycols, in the amounts indicated in the table below:

|  | Polymer | | |
| --- | --- | --- | --- |
|  | 1 | 2 | 3 |
| Diisocyanate, mols | 2.50 | 3 | 3 |
| 2-methyl-2-nitro-1,3-propanediol, mols | 1.5 | | |
| 3-chloro-1,2-propanediol, mols | | 2 | |
| 2,3-dibromo-1,4-butahediol, mols | | | 2 |
| Reaction temp., ° C | 100 | 150 | 100 |
| Tensile Strength, p.s.i | 8,500 | 6,100 | 3,400 |
| Elongation, percent | 370 | 380 | 410 |
| Modulus, 300%, p.s.i | 4,500 | 2,400 | 2,000 |
| Fuel permeability [1] | 0.0000 | 0.0000 | 0.0000 |

[1] Fluid ounces/sq. ft./24 hours of 40% toluene, 60% isooctane.

When the above examples are repeated with one mol of 1,4-butanediol used in place of the halo- and nitro-glycols the fuel permeability was 0.226, and with two mols, 0.070.

To demonstrate an embodiment of elastomeric polyurethanes based on hydroxyl polyalkylene oxides, a mixture of one mol of poly(oxyethylene)glycol having a molecular weight of 601 and two mols of 3-chloro-1,2-propanediol were melted together at 100° C. 3 mols of diphenylmethane-4,4'-diisocyanate was then stirred in and the mixture heated for 3 hours at 100° C. The resulting product had a tensile strength of 8100 p.s.i., a wet tensile after 7 days in 25° C. water of 8400 p.s.i., and a fuel permeability value of 0.0000.

To demonstrate that a mixture of glycols may be used, 0.1 mol of hydroxyl(polyethylene adipate), molecular weight 1010, 0.1 mol of 2-methyl-2-nitro-1,3-propanediol and 0.1 mol of 1,4-butanediol were mixed together and heated to melt the mixture. 0.3 mol of diphenyl methane-4,4'-diisocyanate was added by stirring and the mixture heated for three hours at 140° C. The resulting polymer had a tensile strength of 5400 p.s.i., a 300% modulus of 2500 p.s.i., an elongation of 475% and a fuel permeability of 0.016.

I claim:
1. Thermoplastic polyurethanes resistant to migration of aromatic fuels comprising the reaction product of (1) a hydroxyl-terminated polyester, a hydroxyl poly(alkylene oxide) or a hydroxyl polyacetal, having molecular weights from about 500 to about 4000 and (2) an aliphatic diol containing 2 to 8 carbon atoms and at least one nitro-, chloro-, bromo-, or fluoro-substituent, with (3) an organic diisocyanate, in a molar ratio of one mol of (1), 0.5 to 12 mols of (2), and (3) essentially equimolar to the total of (1) and (2).

2. The polyurethane of claim 1 wherein in (1) the hydroxyl polyester is a polyester of aliphatic dicarboxylic acids of the formula HOOC—R—COOH where R is an alkylene radical containing 2 to 8 carbon atoms and an aliphatic glycol containing between 2 and 10 carbon atoms, the hydroxy poly(akylene oxide) has the formula $$HO[(CH_2)_nO]_xH$$

wherein $n$ is a number from 2 to 6 and $x$ is an integer, and the polyacetals are polyacetals of an aliphatic aldehyde containing 1 to 6 carbon atoms and an aliphatic diol containing 2 to 8 carbon atoms, in (2) the diol is an aliphatic glycol containing 3 to 6 carbon atoms and a nitro- or chloro-substituent, and in (3) the organic diisocyanate is an aromatic diisocyanate present in about equimolar amounts to the total of (1) and (2).

3. The polyurethane of claim 2 wherein (1) is a polyester of butanediol-1,4 and adipic acid and has a molecular weight from about 600 to about 1800, and the aromatic diisocyanate has the formula

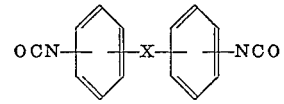

wherein X is a valence bond or an alkylene radical containing 1 to 5 carbon atoms.

4. The polyurethane of claim 3 wherein the aromatic diisocyanate is diphenyl methane-p,p'-diisocyanate, the diol is 3-chloro-1,2-propanediol and the molar ratio of reactants is one mol of polyester, one to 3 mols of 3-chloro-1,2-propanediol, with essentially a molar equivalent amount of diisocyanate.

5. The polyurethane of claim 2 wherein in (1), in the poly(alkylene oxide) formula $n$ is 2 to 4 and the molecular weight is between about 600 and 2000, and the aromatic diisocyanate has the formula

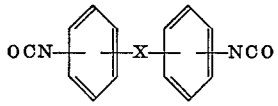

wherein X is a valence bond or an alkylene radical containing 1 to 5 carbon atoms.

6. The polyurethane of claim 5 wherein the poly(alkylene oxide) is poly(oxyethylene)glycol, the aromatic diisocyanate is diphenyl methane-p,p'-diisocyanate, the glycol is 3-chloro-1,2-propanediol and the molar ratio of reactants is one mol of polyester, one to 3 mols of 3-chloro-1,2-propanediol with essentially a molar equivalent amount of diisocyanate.

7. A thermoplastic polyurethane resistant to migration of aromatic fuels comprising the reaction product of (1) a hydroxyl-terminated polyester, a hydroxyl poly(alkylene oxide) or a polyacetal, having molecular weights from about 500 to about 4000 and (2) an aliphatic diol containing 2 to 8 carbon atoms and at least one nitro-substituent, with (3) an organic diisocyanate.

8. The polyurethane of claim 7 wherein in (1) the hydroxyl polyester is a polyester of aliphatic dicarboxylic acids of the formula HOOC—R—COOH where R is an alkylene radical containing 2 to 8 carbon atoms and an aliphatic glycol containing between 2 and 10 carbon atoms the hydroxyl poly(alkylene oxide) has the formula HO[(CH$_2$)$_n$O]$_x$H wherein $n$ is a number from 2 to 6 and $x$ is an integer, and the polyacetals are polyacetals of an aliphatic aldehyde containing 1 to 6 carbon atoms and an aliphatic diol containing 2 to 8 carbon atoms, in (2) the diol is an aliphatic glycol containing 3 to 6 carbon atoms and a nitro-substituent, and in (3) the organic diisocyanate is an aromatic diisocyanate present in about equimolar amounts to the total of (1) and (2).

9. The polyurethane of claim 8 wherein (1) is a polyester of butanediol-1,4 and adipic acid and has a molecular weight from about 600 to about 1800, and the aromatic diisocyanate has the formula

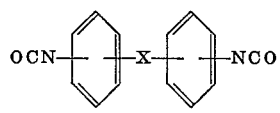

wherein X is a valence bond or an alkylene radical containing 1 to 5 carbon atoms.

10. The polyurethane of claim 9 wherein the aromatic diisocyanate is diphenyl methane-p,p'-diisocyanate, the diol is 2-methyl-2-nitro-1,3-propanediol and the molar ratio of reactants is one mol of polyester, one to 3 mols of 2-methyl-2-nitro-1,3-propanediol, with an essentially molar equivalent amount of diisocyanate.

11. The polyurethane of claim 8 wherein in (1), in the poly(alkylene oxide) formula $n$ is 2 to 4 and the molecular weight is between about 600 and 2000, and the aromatic diisocyanate has the formula

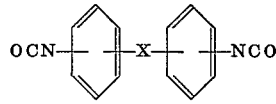

wherein X is a valence bond or an alkylene radical containing 1 to 5 carbon atoms.

12. The polyurethane of claim 11 wherein the poly(alkylene oxide) is poly(oxyethylene)glycol, the aromatic diisocyanate is diphenyl methane-p,p'-diisocyanate, the diol is 2-methyl-2-nitro-1,3-propanediol and the molar ratio of reactants is one mol of poly(oxyethylene)glycol, one to three mols of 2-methyl-2-nitro-1,3-propanediol with an essentially molar equivalent amount of diisocyanate.

References Cited

UNITED STATES PATENTS

| | | | |
|---|---|---|---|
| 2,911,390 | 11/1959 | Smith | 260—77.5 |
| 2,990,379 | 6/1961 | Young et al. | 260—2.5 |
| 3,219,634 | 11/1965 | Watson et al. | 260—77.5 |
| 3,244,754 | 4/1966 | Bruson et al. | 260—615 |
| 3,255,131 | 6/1966 | Ahlbrecht et al. | 260—22 |
| 3,264,233 | 8/1966 | Trescher et al. | 260—2.5 |
| 3,288,863 | 11/1966 | Hall et al. | 260—615 |
| 3,375,220 | 3/1968 | Clark et al. | 260—77.5 |

DONALD E. CZAJA, Primary Examiner

H. S. COCKERAM, Assistant Examiner

U.S. Cl. X.R.

150—.5; 206—1; 260—67, 77.5

UNITED STATES PATENT OFFICE
CERTIFICATE OF CORRECTION

Patent No. 3,475,383                            October 28, 1969

Floyd D. Stewart

It is certified that error appears in the above identified patent and that said Letters Patent are hereby corrected as shown below:

Column 3, line 16, before "ether" insert -- methane diisocyanate, bibenzyl diisocyanate, diphenyl --; line 38, "obtianed" should read -- obtained --. Column 4, in the table, "2,3-dibromo-1,4-butahediol" should read -- 2,3-dibromo-1,4-butanediol --; line 54, "hydroxy" should read -- hydroxyl --.

Signed and sealed this 9th day of June 1970.

(SEAL)
Attest:

EDWARD M. FLETCHER, JR.                    WILLIAM E. SCHUYLER, JR.
Attesting Officer                             Commissioner of Patents